UNITED STATES PATENT OFFICE.

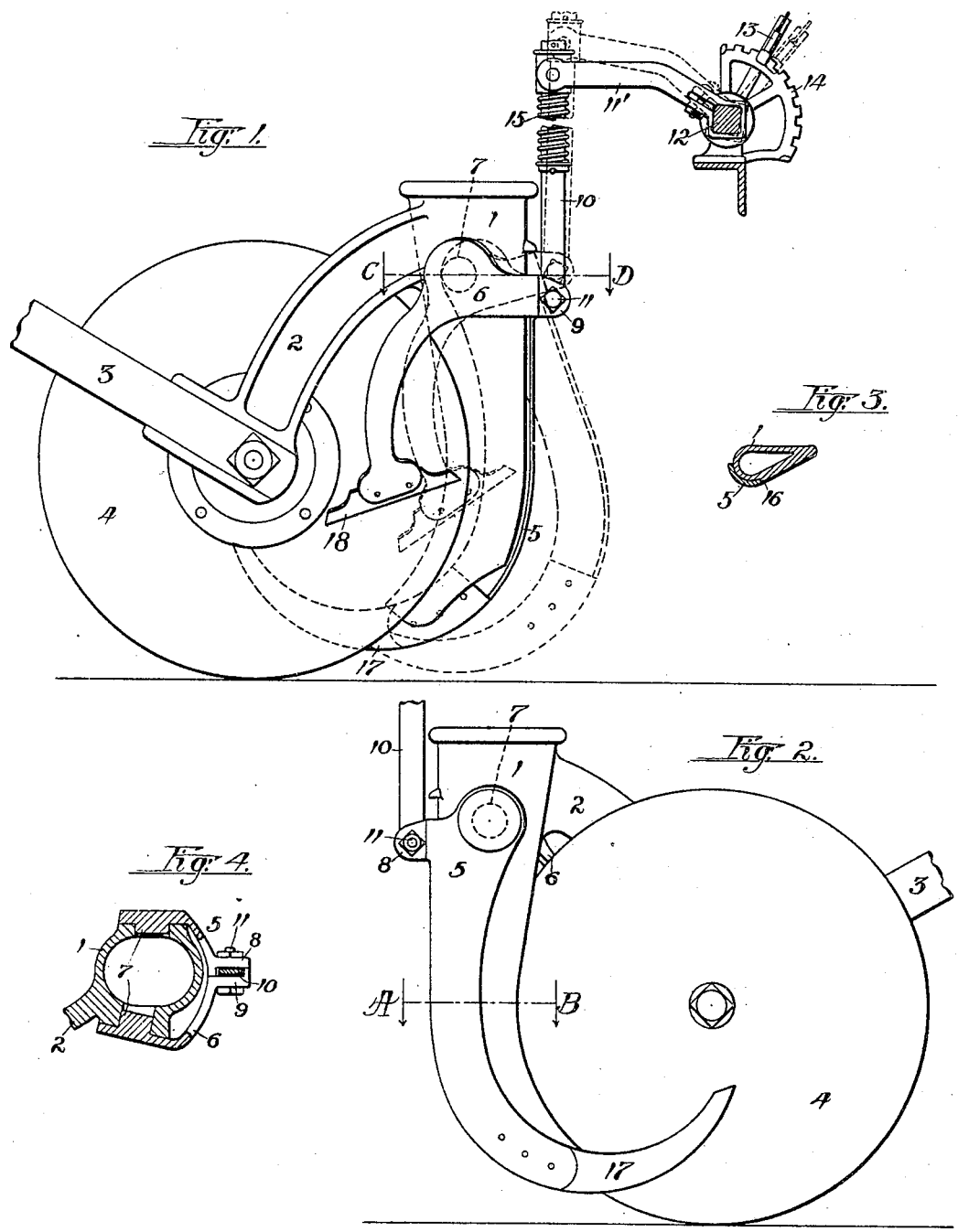

SAMUEL K. DENNIS, OF CHICAGO, ILLINOIS, ASSIGNOR TO INTERNATIONAL HARVESTER COMPANY, A CORPORATION OF NEW JERSEY.

GRAIN-DRILL.

No. 800,555.     Specification of Letters Patent.     Patented Sept. 26, 1905.

Application filed July 28, 1905. Serial No. 271,591.

*To all whom it may concern:*

Be it known that I, SAMUEL K. DENNIS, a citizen of the United States, residing at Chicago, in the county of Cook and State of Illinois, have invented certain new and useful Improvements in Grain-Drills, of which the following is a specification, reference being had to the accompanying drawings, forming a part thereof.

My invention relates to grain-drills, and particularly to scraper attachments for the furrow-opening disks as applied to the above class of machines.

It consists in providing scrapers that are pivotally attached to the disk-support and having a link connection with the usual pressure-arms whereby the scrapers are disengaged from contact with the disks when the pressure-arms are operated to raise them above the surface of the ground, the object of the invention being to provide a construction that will operate to relieve the scrapers from any accumulation of roots or other material that would tend to choke the action of the disks.

I attain the above object by the mechanism illustrated in the accompanying drawings, in which—

Figure 1 represents a side view of a disk-support and disk with my improved scraper mechanism associated therewith. Fig. 2 is a similar view representing the opposite side of Fig. 1. Fig. 3 is a section on line A B of Fig. 2, and Fig. 4 is a section on line C D of Fig. 1.

Similar reference characters refer to similar parts throughout the several views.

1 represents the boot, having the forwardly and downwardly projecting arm 2, to which is secured the rear end of a drag-bar 3 and upon which is rotatably mounted the furrow-opening disk 4. Near the upper end of the boot and upon opposite sides thereof are pivotally mounted scraper-carrying arms 5 and 6, that are provided at their lower ends with steel scrapers attached thereto and adapted to contact along their forward edges with the surface of the disk in a manner to prevent the accumulation of material thereon. The pivotal connection of the arms with the boot consists in bosses 7, forming part of the arms and journaled in openings in the wall of the boot, as shown in Fig. 4. Each arm is provided with a rearwardly and inwardly curved portion partially embracing the boot at its rear upper end, and rearwardly-projecting ear portions 8 and 9, that contact with each other in a manner to leave an intervening opening adapted to loosely receive the lower end of a link 10, that is pivotally mounted upon a bolt 11, passing through openings in the ears and operative to secure them together. The upper end of the link is slidably connected with a presser-arm 11', mounted upon a rock-shaft 12, carried upon the frame of the machine in any of the usual ways and adjustable in its bearings by means of the lever 13 and sector-rack 14, and 15 is a coiled spring surrounding the link 10 and operative in the well-known way to yieldingly press the furrow-openers toward the ground.

The furrow-opening disks have the usual concavo-convex form common to this class of machines and are set at an angle with the line of draft, and the boot is disposed upon the convex side thereof, as shown in Fig. 2. The body portion of the scraper-supporting arm 5 conforms in its general outline with the curve of the boot, and when in operative position lies close to the side thereof and against a raised shoulder 16, that operates to deflect the soil therefrom, as shown in Fig. 3. The steel scraper 17, secured to the arm 5, is curved upward and forward when in operative position from the toe of the boot toward the axis of the disk, and the steel scraper 18, secured to the arm 6, engages with the concave side of the disk in a tangential line relative to the axis thereof.

As the disk rises and falls in following the inequalities of the surface of the ground the spring 15 maintains a constant pressure upon the arms 5 and 6 by means of the link 10 and holds them forward with the scrapers in operative engagement with the disks. When the rock-shaft 12 is operated to raise the disks above the surface of the ground, the link connection pulls upward upon the rearwardly-projecting curved portions of the scraper-supporting arms and causes them to turn about their pivotal connection with the boot and carry the scrapers rearward and out of contact with the surface of the disk.

What I claim as my invention, and desire to secure by Letters Patent, is—

1. In a scraper mechanism for furrow-opening disks, the combination of a disk, a disk-support, means for raising and lowering said support, a scraper pivotally mounted on said support and adapted to engage with said disk, and a connection between said raising and lowering means and said scraper whereby the scraper is moved about its pivot and away from said disk when the support is elevated by the raising means.

2. In a scraper mechanism for furrow-opening disks, the combination of a disk, a disk-support, means for raising and lowering said support comprising a rock-shaft and a pressure-arm mounted thereon, a scraper pivotally mounted on said support and adapted to engage with said disk, and a link connection between said scraper and said pressure-arm whereby the scraper is moved about its pivot and away from said disk when said support is elevated by the raising means.

3. In a scraper mechanism for furrow-opening disks, the combination of a disk, a disk-support, means for raising and lowering said support, a scraper pivotally mounted on said support in a manner to swing substantially parallel with the surface of the disk and adapted to contact therewith when moved in one direction, and a connection between said raising and lowering means whereby the movement of the scraper about its pivotal connection is controlled by said means.

4. In a scraper mechanism for furrow-opening disks, the combination of a disk, a disk-support, means for raising and lowering said support comprising a rock-shaft and a pressure-arm mounted thereon, a scraper pivotally mounted on said support in a manner to swing substantially parallel with the surface of the disk and adapted to contact therewith when moved in one direction, and a link connection between said scraper and said pressure-arm whereby the movement of the scraper about its pivotal connection is controlled by said raising and lowering means.

5. In a scraper mechanism for furrow-opening disks, the combination of a disk, a disk-support, means for raising and lowering said support, scrapers pivotally mounted on the support and disposed upon opposite sides of said disk, and a connection between said raising and lowering means and said scrapers whereby the movement of the latter about their pivotal connection is controlled by said raising and lowering means.

6. In a scraper mechanism for furrow-opening disks, the combination of a disk, a disk-support comprising a boot, means for raising and lowering said boot, scrapers pivotally mounted upon opposite sides of said boot and adapted to contact with opposite sides of said disk when moved in one direction, and a single connection between said raising and lowering means and said scrapers whereby the movement of the latter about their pivotal connection is controlled by said raising and lowering means.

7. In a scraper mechanism for furrow-opening disks, the combination of a disk, a disk-support comprising a boot, means for raising and lowering said boot, arms having their upper ends mounted upon opposite sides of said boot and projecting downward and having steel scrapers secured to their lower ends adapted to contact with opposite sides of said disk when moved in one direction, a connection between said raising and lowering means and said arms whereby the movement of the latter about their pivotal connection is controlled by said raising and lowering means.

8. In a scraper mechanism for furrow-opening disks, the combination of a disk, a disk-support comprising a boot, means for raising and lowering said boot, arms having their upper ends pivotally mounted upon opposite sides of said boot and projecting downward and having steel scrapers secured to their lower ends and adapted to contact with opposite sides of said disk when moved in one direction, the upper ends of said arms having rearwardly and inwardly curved portions partially embracing said boot and provided with rearwardly-projecting ears, a link having its lower end connected with said ears and its upper end connected with the means for raising and lowering the boot.

9. In a scraper mechanism for furrow-opening disks, the combination of a disk, a disk-support comprising a boot disposed at one side thereof in rear of the axis and curved in a manner to conform substantially with the rear edge of said disk, a scraper pivotally mounted at the upper end of the boot and extending downward along its side and having its lower end adapted to contact with the surface of the disk, and a shoulder portion on the boot engaging with a portion of the forward edge of the scraper in a manner to deflect the soil therefrom.

10. In a scraper mechanism for furrow-opening disks, the combination of a disk, a disk-support comprising a boot disposed at one side thereof in rear of the axis and curved in a manner to conform substantially with the rear edge of said disk, means for raising and lowering said support, a scraper pivotally mounted at the upper end of said boot and extending downward along its side and having its lower end curved upward and forward toward the axis of said disk and adapted to contact with the surface of the disk, a shoulder portion on the boot engaging with a portion of the forward edge of the scraper in a manner to deflect the soil therefrom, and a connection between the upper end of the scraper and said means for raising and lowering the support whereby the pivotal movement of the scraper is controlled.

In witness whereof I hereto affix my signature in presence of two witnesses.

SAMUEL K. DENNIS.

Witnesses:
JAMES A. MOXEY,
CHAS. W. NOVAK.